(12) United States Patent
McLaughlin

(10) Patent No.: US 8,409,394 B2
(45) Date of Patent: Apr. 2, 2013

(54) FLUID PRESSURE LAMINATION SYSTEM

(75) Inventor: James McLaughlin, Huntsville, AL (US)

(73) Assignee: First Step Partners, LLC, Huntsville, AL (US)

( * ) Notice: Subject to any disclaimer, the term of this patent is extended or adjusted under 35 U.S.C. 154(b) by 193 days.

(21) Appl. No.: 11/915,668

(22) PCT Filed: May 26, 2006

(86) PCT No.: PCT/US2006/020581
§ 371 (c)(1),
(2), (4) Date: Jul. 14, 2008

(87) PCT Pub. No.: WO2009/128043
PCT Pub. Date: Nov. 30, 2006

(65) Prior Publication Data
US 2009/0205777 A1    Aug. 20, 2009

Related U.S. Application Data

(60) Provisional application No. 60/685,447, filed on May 27, 2005.

(51) Int. Cl.
B29C 65/00 (2006.01)
B31B 1/60 (2006.01)
B32B 37/00 (2006.01)
B32B 41/00 (2006.01)
B65C 9/40 (2006.01)
G05G 15/00 (2006.01)
B27G 11/02 (2006.01)
B29C 65/02 (2006.01)
B31F 5/04 (2006.01)

(52) U.S. Cl. ............... 156/285; 156/60; 156/1; 156/358; 156/382; 156/379.7; 156/379.8

(58) Field of Classification Search .................. 156/285, 156/60, 1, 358, 382, 379.7, 379.8
See application file for complete search history.

(56) References Cited

U.S. PATENT DOCUMENTS
2,182,358 A * 12/1939 Sherts et al. .................. 156/382
4,420,359 A * 12/1983 Goldsworthy ............. 156/379.8

FOREIGN PATENT DOCUMENTS
EP    347936 A2 * 12/1989
JP    1286851    11/1989
JP    4168044    6/1992

OTHER PUBLICATIONS
International Search Report for PCT/US06/020581.

* cited by examiner

Primary Examiner — Christopher Schatz
Assistant Examiner — Matthew Hoover
(74) Attorney, Agent, or Firm — Womble Carlyle Sandridge & Rice, LLP

(57) ABSTRACT

A lamination apparatus has opposed plenums that project pressurized fluids toward a fluid pressure lamination zone. Material sheets to be laminated are advanced through the lamination zone and laminated together due to the pressure exerted by the pressurized fluid.

12 Claims, 2 Drawing Sheets

FLUID PRESSURE LAMINATION SYSTEM

RELATED APPLICATION

This application is the National Stage of International Application PCT/US2006/020581, filed on May 26, 2006, which claims the benefit of U.S. provisional patent application Ser. No. 60/685,447, filed on May 27, 2005, the contents of both documents being hereby incorporated by reference.

BACKGROUND

1. Technical Field

The present invention generally relates to lamination processes involving the use of fluids as media to generate lamination pressures.

2. Related Art

Fluid pressure laminations systems are known. Conventional lamination systems of this type generally require fluid-tight seals to seal a lamination section of the system in order to generate the required lamination pressures. Because the fluid-tight seals may contact moving belts or other surfaces in the system, they eventually wear out and must be replaced, which increases the cost of operation of the system. As the seals are subjected to wear, the fluid lamination pressures may vary and the lamination system may not produce consistent results. Also, because the lamination area must be sealed in order to generate the required lamination pressures, the items to be laminated must be of a particular size and perimeter shape in order to be accommodated within the sealed lamination section. In some conventional systems, the lamination area must be specifically tailored to laminate materials of a particular perimeter shape and size. U.S. Pat. No. 4,420,359 to Goldsworthy discloses a lamination apparatus with seals used to enclose a lamination area.

SUMMARY

According to a first embodiment of the present invention, a lamination apparatus comprises at least one source of pressurized fluid, a first plenum in fluid communication with the at least one source of pressurized fluid, the first plenum having a first plurality of apertures, and a second plenum in fluid communication with the at least one source of pressurized fluid, the first plenum having a second plurality of apertures. A fluid pressure lamination zone is defined between the first and second plenums, the first and second pluralities of apertures being arranged on opposite sides of the fluid pressure lamination zone in order to direct pressurized fluids toward the lamination zone. One or more of the sides of the fluid pressure lamination zone are open, allowing the pressurized fluids to escape from the lamination zone during lamination.

According to one exemplary aspect of the present invention, the apparatus does not require fluid-tight seals around the lamination zone in order to develop pressure for laminating the sheets. The absence of seals between moving parts increases the service life and the reliability of the apparatus.

According to another exemplary aspect of the invention, materials may be laminated at any location between the upper and lower plenums, and there is no requirement for careful alignment of materials to be laminated within the lamination zone. In general, sheets of any width and length, whether discrete or continuous, can be advanced through the lamination apparatus, so long as the sheets are sufficiently narrow to fit within the width of the lamination zone between the first and second plenums. Adjustment of the lamination apparatus is not required in order to accommodate sheets of different widths and/or lengths.

According to yet another exemplary aspect of the present invention, sheets having perimeters of essentially any shape can be accommodated in the lamination apparatus. No seals are required to conform to the perimeters of the sheets, so a single lamination apparatus can be used to laminate a large variety of sheet perimeter shapes. Sheets of varying thicknesses can also be laminated in a single lamination apparatus.

According to yet another exemplary aspect of the invention, sheets advancing through lamination apparatus, or belts conveying sheets through the lamination apparatus, may be supported by a thin cushion of pressurized fluid, which greatly reduces the force required to advance the sheets through the lamination apparatus.

Other aspects, features, and details of embodiments of the present invention can be more completely understood by reference to the following detailed description of preferred embodiments, taken in conjunction with the drawings figures and from the appended claims.

BRIEF DESCRIPTION OF THE DRAWING FIGURES

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

The invention as exemplified by the present embodiments discussed below is generally directed to a fluid pressure lamination system and method. The lamination system may laminate continuously moving sheets of materials by passing the sheets through a lamination zone pressurized by fluid flows.

In this specification, the term "sheet" indicates any generally planar material suitable for passing through the lamination zone in the illustrated lamination apparatus. The term "sheet" encompasses planar materials such as flexible sheets, such as those taken from rolls, and rigid or relatively rigid materials such as substrates or cores used in the formation of floor tiles, doors, and other rigid or relatively rigid articles. Although the sheets illustrated in the exemplary embodiment are continuous sheets provided on rolls, the sheets can be provided as individual, discrete units. For example, a first series of individual discrete sheet units may be laminated to a second series of discrete sheet units, or laminated to a continuous sheet of a second material. Other combinations of multiple layers of individual and continuous sheets of material are also possible.

Figure 1:
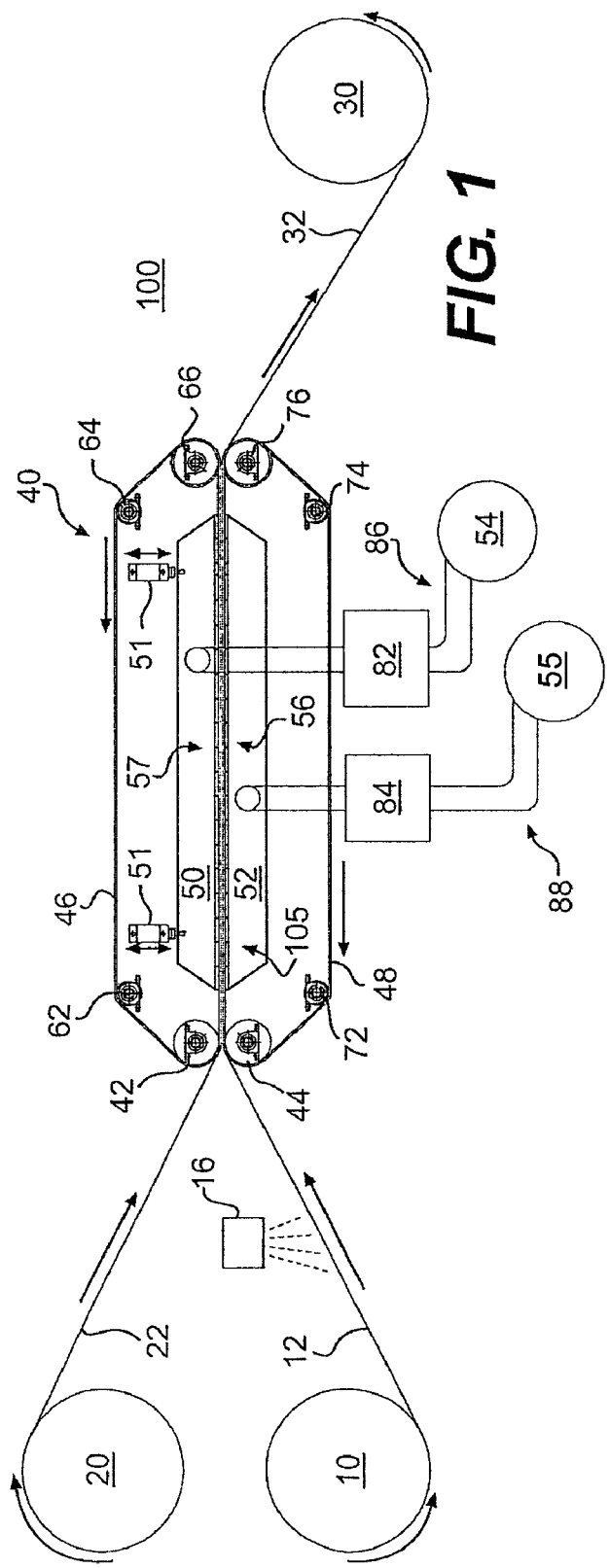
FIG. 1 is a schematic illustration of a lamination system having a lamination apparatus according to a first embodiment of the invention.

FIG. 1 is a partially schematic illustration of a lamination system 100 according to a first embodiment of the present invention. In general, the lamination system 100 includes a first roll 10 of a first sheet of material 12, a second roll 20 of a second sheet of material 22, a third roll 30 for collecting a laminated material 32 formed from the first and second sheets 12, 22, and a lamination apparatus 40 for combining the sheets of material 12, 22 into the laminate material 32.

The rolls 10, 20, 30 may be, for example, conventionally rotatably mounted on supports (not shown). If the first and second sheets of material 12, 22 are of sufficient strength so that they will not rip or tear during lamination, the first and second rolls 10, 20 may be mounted on friction bearings, for example. The first and second sheets 12, 22 may, for example, be pulled from the rolls 10, 20 by the lamination apparatus 40 in the directions of the arrows located next to the sheets 12, 22.

In general, the lamination apparatus 40 comprises a first, upper belt 46, a second, lower belt 48, a first, upper plenum 50, a second, lower plenum 52, a first, upper blower 54, and a second, lower blower 56. The upper belt 46 is driven by and supported on rollers 42, 62, 64, 66 and rotates in the direction of the arrow located adjacent to the upper belt 46. The lower belt 48 is driven by and supported on rollers 44, 72, 74, 76 and rotates in the direction of the arrow located adjacent to the lower belt 48. The rollers 42, 44 may be, for example, pinch or nip rollers arranged to exert pressure on the sheets 12, 22 at the entrance to the lamination apparatus 40. The rollers 42, 44 may be powered and may serve to pull the sheets 12, 22 from the rolls 10, 20. In order to provide variable adjustment of the pressure exerted on the first and second sheets 12, 22, the rollers 42, 44 may be vertically adjustable by devices such as hydraulic cylinders (not shown). If desired, the first and second rolls 10, 20 may be actively driven in order to assist removal of the sheets 12, 22 from their respective rolls.

The exterior surfaces of the upper and lower belts 46, 48 face one another in the area between the upper and lower plenums 50, 52. The upper and lower plenums 50, 52 provide the fluid flow that presses against the interior surfaces of the upper and lower belts 46, 48, respectively, so that the exterior sides of the belts 46, 48 press against the sandwiched sheets 12, 22. The area between the upper and lower plenums 50, 52 is generally referred to as a fluid pressure lamination zone and is indicated by the reference number 105 in FIG. 1. The upper plenum 50, along with the upper belt 46 and the rollers 42, 62, 64, 66 may be vertically translatable by vertical adjustment mechanisms 51 in order to vary the pressure within the fluid pressure lamination zone 105. The adjustment mechanisms 51 may be, for example, hydraulic or screw adjustment devices. The adjustment mechanisms 51 are illustrated as hydraulic devices in FIG. 1. The lower plenum 52, the lower belt 48 and its supporting rollers may also be vertically translatable by adjustment mechanisms (not shown).

During lamination, the upper and lower blowers 54, 55 provide the upper and lower plenums 50, 52 respectively with a continuous flow of pressurized fluid in order to pressurize the upper and lower plenums 50, 52. An upper heater and/or chiller 82 may be interposed in the supply line 86 connecting the upper blower 54 to the upper plenum 50. Similarly, a lower heater and/or chiller 84 may be interposed in the supply line 88 connecting the lower blower 55 to the lower plenum 52. The upper and lower heater/chillers 82, 84 can be used to selectively heat and/or cool the fluid flows, and thus the materials 12, 22 during the lamination process.

Figure 2:
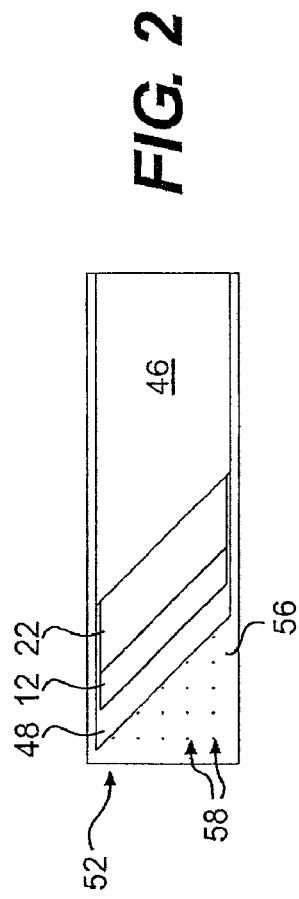
FIG. 2 is a partial cutaway top plan view of a lamination zone of the lamination system.

FIG. 2 is a partial cutaway view of the lamination apparatus 40, looking down on the upper belt 46, with parts of the belts 46, 48 and the materials 12, 22 cut away. Referring to FIGS. 1 and 2, an upper surface of the lower plenum 42 comprises a lower plate 56 with a plurality of apertures 58 extending through the lower plate 56 to the interior of the plenum 52. The upper plenum 50 includes a similar upper plate 57 with apertures (not shown) extending through the plate 57 and into the interior of the plenum 50. The upper plate 57 of the upper plenum 50 is located above the interior surface of the upper belt 46, and the lower plate 56 of the lower plenum 52 located below the interior surface of the lower belt 48. During lamination, the first and second sheets 12, 22 are sandwiched between the upper and lower belts 46, 48 once they enter the lamination apparatus 40, and are advanced into the fluid pressure lamination zone 105 between the upper and lower plates 56, 57. Pressurized fluid is forced through the apertures in the plates 56, 57 and presses the upper and lower belts 46, 48 against the sheets 12, 22 while they are in the lamination zone 105. The apertures in the plates 56, 57 may be relatively closely spaced to increase the uniformity of fluid pressure in the lamination zone 105.

Figures 3, 4:
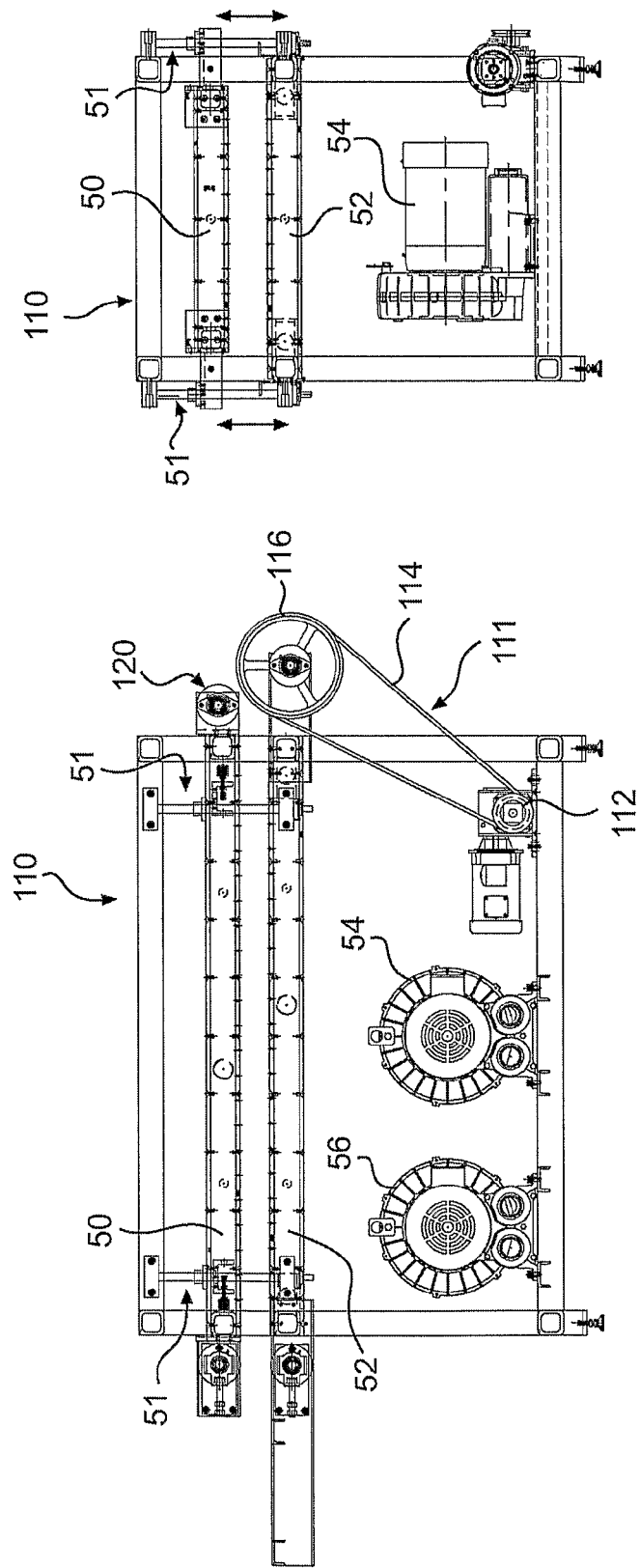
FIG. 3 is a front elevational view of selected elements of the lamination apparatus.
FIG. 4 is an end view of selected elements of the lamination apparatus.

FIG. 3 is a front elevational view and FIG. 4 is an end view of selected elements of the lamination apparatus 40. FIGS. 3 and 4 illustrate in detail a frame 110, a belt drive 111, the upper and lower plenums 50, 52, and the upper and lower blowers 54, 56 of the lamination apparatus 40. The belt drive 111 includes a motor 112 that drives a belt 114, which turns a lower belt drive pulley 116. The lower belt drive pulley 116 drives the lower belt 48. The lower belt drive pulley 116 can be geared to an upper belt drive pulley 120 that drives the upper belt 46. Referring to FIG. 4, the adjustment mechanisms 51 are arranged on the frame 110 to provide vertical translation of the upper plenum 50. The mechanisms 51 can be, for example, screw devices, hydraulic devices, or other adjustment means connected to an automated or a manual control device, for example. The mechanisms 51 illustrated in FIGS. 3 and 4 are screw adjustment mechanisms. In FIGS. 3 and 4, the upper and lower plenums 50, 52 are shown in section, with the interiors of the plenums illustrated.

Operation of the lamination system 100 will now be discussed with reference to FIGS. 1 and 2.

In operation, as the first and second sheets 12, 22 are unrolled from their respective rolls 10, 20, either one or both of the sheets 12, 22 may have adhesive, such as, for example, glue, applied by an adhesive applicator 16. The first and second sheets of material 12, 22 enter the lamination apparatus 40 at the nip rollers 42, 44, which may be configured to exert a relatively high pressure on the sheets 12, 22. The speed that the sheets 12, 22 are pulled through the lamination apparatus may be adjusted to ensure that the sheets 12, 22 are under a relatively constant pressure for the time, or dwell, required for the adhesive to set. The pressure exerted by the nip rollers 42, 44 may be adjusted to provide a desired degree of initial compression and adhesion of the sheets 12, 22 before they enter the fluid pressure lamination zone 105. One or more of the rollers 42, 62, 64, 66 may be driven to drive the upper belt 46, and one or more of the rollers 44, 72, 74, 76 may be driven to drive the lower belt 48. The rotation of the belts 46, 48 advances the sheets 12, 22 to the fluid pressure lamination zone 105. The sheets 12, 22 may be continuously moved through the apparatus 40.

As the sheets advance 12, 22 toward the fluid pressure fluid lamination zone 105, the sheets are sandwiched between the exterior surfaces of the upper and lower belts 46, 48. Fluid flows downward from the apertures in the upper plate 57 and presses against the interior surface of the upper belt 46, while fluid flows upward from the apertures in the lower plate 56 and against the interior surface of the lower belt 48. Pressurized fluid from the upper and lower plenums 50, 52 therefore provides positive compression of the sheets 12, 22 which laminates the sheets together. During the lamination operation, the pressurized fluid from the upper and lower plenums 50, 52 exits from one or more open sides and ends of the lamination zone 105, where it may escape the system 100 or be recaptured for further use. In the illustrated exemplary embodiment, all sides of the lamination zone 105 are open. In general, no seals are required to seal the fluid pressure lamination zone 105. If desired, a deflector plate or other structure can be provided at one or more edges of the lamination zone in order to direct the escaping fluids in a desired direction, which may facilitate recapture of the lamination fluid.

During the fluid pressure lamination process, the upper and lower blowers 54, 55 provide high-pressure fluid to the upper and lower plenums 50, 52, respectively, to maintain lamination pressure in the fluid pressure lamination zone 105. The supply of pressurized lamination fluid can be substantially continuous as the material sheets 12, 22 move through the fluid pressure lamination zone 105. The upper belt 46 is supported and urged toward the material sheets 22, 12 by a thin cushion of fluid flowing from the apertures in the upper plenum 50. Similarly, the lower belt 48 is supported and urged toward the materials 12, 22 by a thin cushion of fluid flowing from the apertures in the lower plenum 52. The pressure exerted against the upper and lower belts 46, 48 is relatively constant in the space between the upper and lower plenums 50, 52, and no seals are required at or around the lamination zone 105 to develop pressures required for lamination. A relatively constant pressure is therefore applied against the faces of the sheets 12, 22 through the upper and lower belts 46, 48. The thin cushions of fluid support the upper and lower belts 46, 48 essentially without friction, which significantly reduces the power required to drive the belts 46, 48.

If desired, fluid supplied to either or both of the upper and lower plenums 50, 52 may be selectively heated and/or cooled by the heater/chillers 82, 84. The heating and/or cooling of the lamination fluid may be timed, for example, according to the material requirements of the sheets 12, 22 and the adhesive used in the lamination process. For example, if hot melt glue powder adhesive is used, the nip rollers 42, 44 may be heated to heat the glue powder, and the fluid provided to the upper and lower plenums 50, 52 may be of a temperature selected to cool the glue. If both heating and cooling are to be performed in the fluid pressure lamination zone, multiple upper and lower plenum pairs may be provided, each plenum pair being capable of individual heating and cooling. For example, a first plenum pair could heat an initial section of a lamination zone in order to melt a hot-melt glue, and a second plenum pair could be provided to cool the hot-melt glue. If desired, heated and/or cooled lamination fluids can be recaptured and recycled in the lamination system 100 to reduce energy costs. The pressure in the lamination zone 105 may also be varied during the lamination process by, for example, varying the output of the blowers 54, 56, or vertically translating one or both of the plenums 50, 52.

Accordingly, the sheets 12, 22 are subjected to suitable lamination pressures and/or heating or cooling in the fluid pressure lamination zone 105. After lamination in the lamination apparatus 40, the first and second material sheets 12, 22 comprise a laminate material 32 and are rolled onto the third roll 30. The laminate 32 may alternatively be cut into individual sections after exiting the apparatus 40, or subjected to further processing steps.

In the above-described embodiment, the pressurized fluid provided by the plenums 50, 52 can be, for example, air drawn from the atmosphere, or other gases such as, for example, Nitrogen, Argon, etc. Liquids may also be used as the lamination fluid. In certain applications, a constant or nearly constant pressure may be required in the lamination zone 105. In such applications, pressure monitors (not shown) may be placed in the lamination zone 105 and/or in the upper and lower plenums 50, 52. The pressure monitors may provide pressure readings to a control, which can in turn adjust the output of the blowers 54, 55 and/or the vertical positions of one or both of the upper or lower plenums 50, 52. Such a feedback loop can be designed to maintain the pressure within the upper and lower plenums 50, 52 within acceptable parameters.

If desired, the fluid or fluids used to provide lamination pressures in the lamination apparatus 40 may be recovered and recycled for further use in the lamination process. For example, the fluids escaping from the open sides and ends of the lamination zone 105 may be recaptured in an enclosed shell or vessel surrounding all or part of the lamination apparatus 40, and routed to an intake of one or both of the blowers 54, 55. If the lamination fluid is heated or cooled during the lamination process, recycling the heated or cooled fluids reduces the energy requirements of the system. If liquid is used as the lamination fluid, the fluid escaping the lamination zone can be recaptured in gutters, for example.

According to the exemplary embodiment, two blowers 54, 55 are used to pressurize the upper and lower plenums 50, 52, respectively. A single blower may alternatively be used to pressurize both plenums 50, 52. If a liquid or gaseous liquid is used as the lamination fluid, alternative sources of pressurized fluids, such as one or more pumps, boilers, or other means, can be used to pressurize one or both of the plenums.

A single upper plenum 50 and a single lower plenum 52 are shown in the illustrated embodiment, although multiple, sequentially arranged plenum pairs could be used in the lamination apparatus 40. The sequential plenum pairs would create consecutive lamination zones capable of achieving different lamination pressures and/or temperatures.

In the illustrated exemplary embodiment, belts 46, 48 are used to convey sheets through the lamination apparatus 40 and to transmit fluid pressure exerted from the upper and lower plenums 50, 52 to the overlapped sheets 12, 22. The upper and lower belts 46, 48 are sufficiently resilient so as to be driven by rollers, and may be solid or substantially solid in order to prevent fluid from passing therethrough. If the sheets 12, 22 are of low porosity, the belts 46, 48 may be porous to varying degrees. If the sheets 12, 22, are of sufficiently low porosity, the belts 46, 48 may be omitted and the sheets 12, 22 fed directly between the plenums 50, 52. In this embodiment, the sheets 12, 22 would be directly supported by thin cushions of lamination fluid flowing from the upper and lower plenums 50, 52. Alternatively, either the upper or lower belt may be omitted and the other belt retained. If no belts are present, the thin cushions of fluid support the sheets 12, 22 essentially without friction, which significantly reduces the power required to move the sheets 12, 22 through the lamination apparatus 40.

The exemplary embodiment illustrates opposed plenum plates 56, 57 with apertures arranged to project pressurized fluid into the lamination zone 105. As an alternative to plenums, a plurality of nozzles (not shown) could be arranged above and below the lamination zone. The nozzles project pressurized fluid into the lamination zone in a manner similar to the fluid flows provided by the apertured plates 56, 57.

In the illustrated exemplary embodiment, the adhesive applicator 16 is a glue sprayer device. Other applicator devices, such as conventional devices for applying hot melt glue or glue powder, may also be used. If a powdered or hot melt glue is used to adhere the sheets 12, 22 together, the nip rollers 42, 44 may be heated to melt or maintain the temperature of melted glue. In alternative embodiments, the adhesive applicator may be omitted, and the sheets may be laminated using methods such as thermoplastic bonding, radiofrequency heating bonding, UV light curing or other curing methods.

The blowers 54, 55 can maintain a pressure in the plenums 50, 52 in the range of, for example, at least 2 psi. The first and second sheets 12, 22 may be subjected to lamination pressures of at least about 1 psi, for example. Higher lamination pressures may be obtained by using additional and/or more powerful sources of pressurized fluid, and reinforcing the plenums 50, 52 if necessary. Lower lamination pressures may be used. The apertures in the plenum plates 56, 57 may be relatively closely spaced. In one embodiment, the apertures have a diameter of about 1/8 inch and are spaced in the range of about 3 inches apart.

If the sheets 12, 22 are too stiff to be provided on rolls, such as where a laminate is applied to a substrate, the sheets may be provided by alternative means. For example, overlapped sheets or units of material can be provided to the lamination apparatus 40 by conveyor systems, or other conveying means (not shown).

Although the sheets 12, 22 illustrated in the exemplary embodiment are continuous sheets provided on rolls, lamination of various combinations of individual, discrete sheet units and continuous sheets of material are also possible.

For example, in the formation of a door, a series of first discrete veneer sheets or units of steel, aluminum, wood, vinyl, etc., may be provided to the lamination apparatus 40, along with a second series of discrete veneer sheets. Discrete core units, such as foam or honeycomb material cores, can be sequentially inserted between the first and second sheets of veneer. Adhesive may be applied to the interior surfaces of the veneers or to the exterior surfaces of the core units. The first and second sheets of veneer with the sequentially spaced core units sandwiched therebetween are then advanced through the lamination apparatus 40, resulting in discrete first veneer/core/second veneer laminates.

In an alternative method of forming a door, the first and second veneers can be provided as continuous sheets and unwound from a coil. Discrete core units can be inserted between the first and second continuous sheets and the overlapped veneer sheets and core units fed to the lamination machine 40 for lamination. The resulting continuous laminate can be cut into individual sections as it exits the lamination apparatus 40, or subjected to further processing steps before separation into individual door units.

In another application, used in the formation of floor tiles, sheets or units of flooring substrate are conveyed into the lamination apparatus 40 on a conveyor belt and laminated in a manner generally as described above. In general, any number of sheets, whether discrete or continuous, can be overlapped and passed through the lamination apparatus 40.

According to one aspect of the exemplary embodiment, the upper and lower plenums 50, 52 do not require air seals at the upper and lower belts 46, 48 to develop a pressure for laminating the first and second sheets 12, 22. The absence of seals between moving parts at the lamination zone increases the service life and the reliability of the lamination system 100.

According to another aspect of the present invention, materials may be laminated at any location between the upper and lower plenums 50, 52, and there is no requirement for careful alignment of the materials to be laminated within the lamination zone 105. Referring to FIG. 2, the length of a sheet to be laminated is measured from right to left, along the direction of travel of the sheets. The width of a sheet is defined in the transverse direction. In general, sheets of any width can be accommodated within the lamination apparatus 40, so long as they are sufficiently narrow to fit within the width of the lamination zone 105 between the plenums. No adjustment of the apparatus is required to accommodate sheets of different widths, other than adjustments addressing the desired lamination temperatures and pressures.

The top plan view of FIG. 2 illustrates lamination of continuous sheets 12, 22 of uniform width. Sheets having perimeters or exterior edges of essentially any shape, however, can be accommodated in the lamination apparatus. No seals are required to conform to the perimeters of the sheets, whether the sheets are continuous or discrete, so a single lamination apparatus can be used to laminate a large variety of sheet perimeter shapes. Therefore, it is possible to laminate sheets of different plan shape in sequential production runs without adjusting the apparatus. Sheets of varying thicknesses can also be laminated in a single lamination apparatus.

According to yet another exemplary aspect of the present invention, the material sheets 12, 22 may be continuously laminated at a relatively high rate. In particular, there is no requirement to stop the advancing sheets 12, 22 in order to seal a section of the sheets within a pressurized lamination zone. In one application, the material sheets 12, 22 may be laminated at a rate of 200 feet per minute. In other applications, lamination rates may vary. Lamination rates will be affected by factors, such as, for example, the type of adhesive used and the type of material sheets to be laminated.

The foregoing description of the invention illustrates and describes the present invention. Additionally, the disclosure shows and describes only selected embodiments of the invention, but it is to be understood that the invention is capable of use in various other combinations, modifications, and environments and is capable of changes or modifications within the scope of the inventive concept as expressed herein, commensurate with the above teachings, and/or within the skill or knowledge of the relevant art.

What is claimed is:

1. A pressure lamination apparatus for laminating sheets of material, comprising:
   at least one source of pressurized gas;
   a first plenum in communication with the at least one source of pressurized gas, the first plenum having a first plurality of apertures; and
   a second plenum in communication with the at least one source of pressurized gas, the second plenum having a second plurality of apertures,
   wherein a pressure lamination zone is defined between the first and second plenums, the first and second pluralities of apertures being arranged on opposite sides of the pressure lamination zone to direct pressurized gas toward the pressure lamination zone, and wherein
   one or more sides of the pressure lamination zone are open and absent a seal so that the pressure lamination zone is unenclosed on said one or more sides to allow escape of pressurized gas from the pressure lamination zone during lamination.

2. The lamination apparatus of claim 1, further comprising a first plurality of rollers and a second plurality of rollers, the first and second pluralities of rollers being arranged to convey sheets of material through the pressure lamination zone.

3. The lamination apparatus of claim 2, further comprising a first belt supported on the first plurality of rollers and a second belt supported on the second plurality of rollers, the first belt extending around the first plenum and the second belt extending around the second plenum.

4. The lamination apparatus of claim 1, further comprising a heating device arranged to heat gas supplied from the at least one source of pressurized gas.

5. The lamination apparatus of claim 4, further comprising a cooling device arranged to cool supplied from the at least one source of pressurized gas.

6. The lamination apparatus according to claim 1, wherein the first plenum is vertically translatable by at least one vertical adjustment mechanism.

7. The lamination apparatus of claim 2, wherein one of the first plurality of rollers is a first pinch or nip roller, and one of the second plurality of rollers is a second pinch or nip roller, the first and second pinch or nip rollers being arranged to compress materials to be laminated.

8. The lamination apparatus of claim 1, wherein the gas is atmospheric air.

9. The lamination apparatus according to claim 1, wherein the first plenum is located directly above the second plenum.

10. The lamination apparatus according to claim 1, further comprising an adhesive applicator.

11. The lamination apparatus according to claim 1, wherein the first plenum comprises a first plate, wherein the first plurality of apertures is formed in the first plate, and wherein the second plenum comprises a second plate, the second plurality of apertures being formed in the second plate.

12. The lamination apparatus of claim 11, wherein the first plate is substantially parallel to the second plate.

* * * * *